United States Patent
DiPoala (10) Patent No.: US 10,460,578 B2
(45) Date of Patent: Oct. 29, 2019

(54) WINDOW SENSING DEVICE WITH MOVEMENT DETECTION

(71) Applicant: Robert Bosch GmbH, Stuttgart (DE)

(72) Inventor: William DiPoala, Fairport, NY (US)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/778,672

(22) PCT Filed: Dec. 29, 2016

(86) PCT No.: PCT/US2016/069235
§ 371 (c)(1),
(2) Date: May 24, 2018

(87) PCT Pub. No.: WO2017/117402
PCT Pub. Date: Jul. 6, 2017

(65) Prior Publication Data
US 2018/0357866 A1    Dec. 13, 2018

Related U.S. Application Data

(60) Provisional application No. 62/274,007, filed on Dec. 31, 2015.

(51) Int. Cl.
*G08B 13/08* (2006.01)
*G08B 13/14* (2006.01)
(Continued)

(52) U.S. Cl.
CPC .............. *G08B 13/08* (2013.01); *G01D 5/145* (2013.01); *G01P 15/131* (2013.01);
(Continued)

(58) Field of Classification Search
CPC ........ G01D 5/06; G01D 5/145; G01P 15/131; G05G 2009/04755; G08B 13/08; G08B 13/1436; G08B 25/008; G08B 25/009
See application file for complete search history.

(56) References Cited

U.S. PATENT DOCUMENTS

| 5,712,621 A | 1/1998 | Andersen |
| 6,388,572 B1 | 5/2002 | Salter |

(Continued)

FOREIGN PATENT DOCUMENTS

WO    20150017805 A1    2/2015

OTHER PUBLICATIONS

International Preliminary Report on Patentability for Application No. PCT/US2016/069235 dated Jul. 12, 2018 (10 pages).
(Continued)

*Primary Examiner* — Sisay Yacob
(74) *Attorney, Agent, or Firm* — Michael Best & Friedrich LLP (57) ABSTRACT

A window sensing device with movement detection enables use of a window sensing arrangement to provide an indication even when a window sash that is open is moved, while an alarm system is armed. The window sensing device includes an accelerometer configured to sense movement of a window sash in a given direction. A magnetic sensor is configured to sense presence of a magnet when the window sash is in a closed position. An electronic controller outputs a normal state wireless signal when the magnetic sensor senses the magnet and outputs an alarm state wireless signal when the magnetic sensor does not sense the presence of the magnet. When the electronic controller is outputting an alarm state wireless signal and the accelerometer senses movement of a window sash, the electronic controller outputs an indication of movement of a window sash in a given direction.

15 Claims, 10 Drawing Sheets

(51) Int. Cl.
*G08B 25/00* (2006.01)
*G01D 5/14* (2006.01)
*G01P 15/13* (2006.01)
*G01D 5/06* (2006.01)
*G05G 9/047* (2006.01)

(52) U.S. Cl.
CPC ....... *G08B 13/1436* (2013.01); *G08B 25/009* (2013.01); *G01D 5/06* (2013.01); *G05G 2009/04755* (2013.01); *G08B 25/008* (2013.01)

(56) References Cited

U.S. PATENT DOCUMENTS

| | | | |
|---|---|---|---|
| 8,773,263 B2 * | 7/2014 | Thibault | G08B 29/22 340/545.1 |
| 8,955,022 B2 | 2/2015 | Poder et al. | |
| 2003/0071739 A1 * | 4/2003 | Addy | G08B 13/08 340/686.1 |
| 2008/0094204 A1 | 4/2008 | Kogan et al. | |
| 2008/0157964 A1 | 7/2008 | Eskildsen et al. | |
| 2009/0140858 A1 * | 6/2009 | Gore | G08B 13/04 340/547 |
| 2013/0057404 A1 * | 3/2013 | Thibault | G08B 29/22 340/545.1 |
| 2013/0057405 A1 | 3/2013 | Seelman et al. | |
| 2014/0320286 A1 | 10/2014 | Thibault | |
| 2016/0165323 A1 * | 6/2016 | Hollis | H04Q 9/00 340/870.16 |

OTHER PUBLICATIONS

International Search Report and Written Opinion for Application No. PCT/US2016/069235 dated Dec. 29, 2016 (18 pages).

* cited by examiner

WINDOW SENSING DEVICE WITH MOVEMENT DETECTION

RELATED APPLICATIONS

This application claims priority from U.S. provisional application 62/274,007, filed Dec. 31, 2015, the entire content of which is hereby incorporated by reference.

BACKGROUND

The present invention relates to a window sensing device with movement detection.

Figure 1:
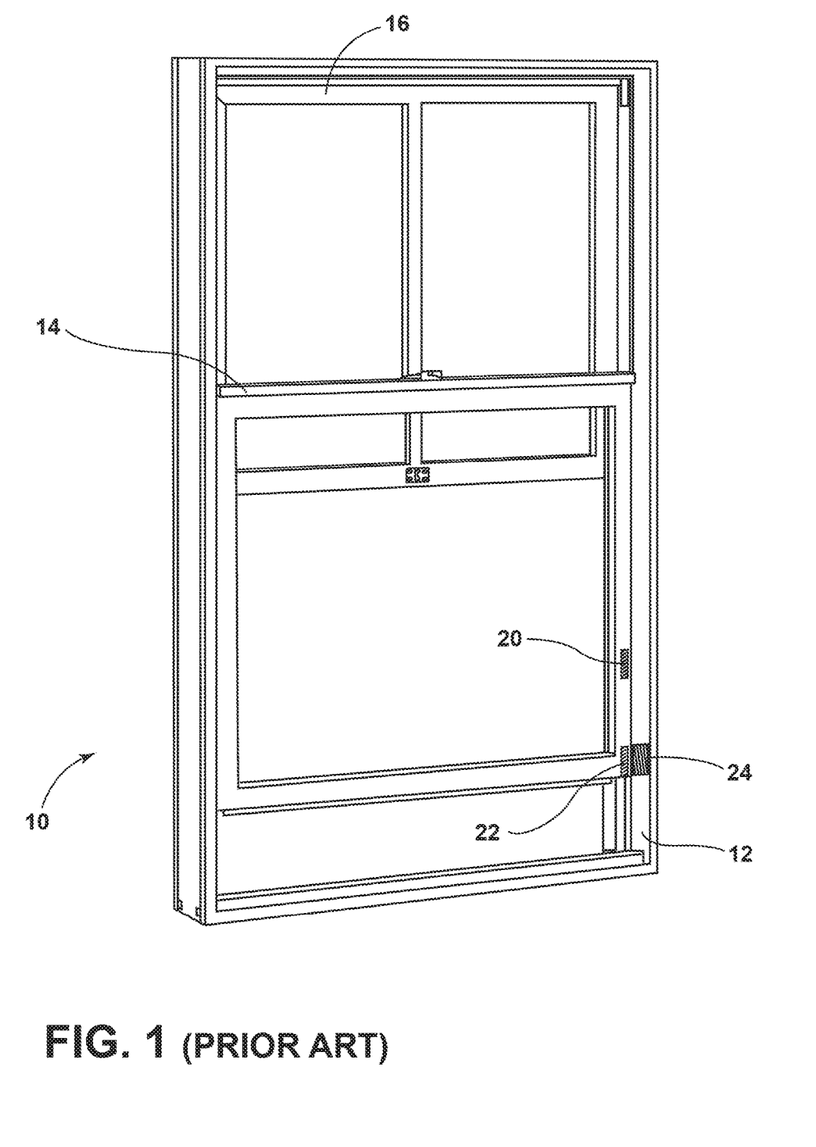
FIG. 1 is a perspective view of a prior art magnetic sensing window arrangement.

FIG. 1 shows a known magnetic sensing window arrangement 10 that includes a window frame 12 and a lower sliding window or lower window sash 14 in a partially open position. An upper window or upper window sash 16 is provided that is either fixed in place, or in some instances, also vertically movable. An upper magnet 20 and a lower magnet 22 are mounted vertically spaced onto an edge part of the lower sliding window 14. A magnetic sensor 24 is mounted to the window frame 12 upwardly from a lower corner of the lower sliding window 14 and near the magnets 20, 22. In the open position shown in FIG. 1, the lower magnet 22 is in alignment with the magnetic sensor 24 and thus is detected. Therefore, the magnetic sensor 24 can enable arming of an alarm system even though the window is in an open position. In a second closed position, the sliding window 14 is closed and the upper magnet 20 is adjacent to and in alignment with the magnetic sensor 24. Thus, the magnetic sensing window arrangement 10 enables arming of an alarm system both when the lower sliding window 14 is open a specific predetermined distance and when the lower sliding window 14 is closed. The magnetic sensing window arrangement 10 does not distinguish between the closed window position and the lower sliding window 14 being opened a predetermined distance.

One disadvantage of the known magnetic sensing window arrangement 10 is that the lower sliding window 14 must be aligned and maintained at the exact location shown in FIG. 1 so that the magnet 22 is adjacent the magnetic sensor 24. Another disadvantage is that the lower sliding window 14 can only be opened a set small amount. Another disadvantage is the requirement of two magnets 20, 22 in the prior art arrangement.

SUMMARY

The embodiments are directed to eliminating the need to provide a second magnet for sensing an open window sash, and thus any alignment issues with a magnet for an opened window sash. For instance, a window sash can be open a small distance such that a person cannot enter. Upon opening the window sash a greater distance, an alarm state wireless signal is provided.

In one embodiment, the invention provides a window sensing device for securing to a window comprising: a housing, an accelerometer configured to sense movement of a window sash in a given direction, a magnetic sensor configured to sense presence of a magnet, a wireless transmitter circuit, and an electronic controller for receiving an input from the accelerometer and an input from the magnetic sensor. The electronic controller is configured to control the wireless transmitter circuit to output a normal state wireless signal when the magnetic sensor senses the presence of the magnet and to output an alarm state wireless signal when the magnetic sensor does not sense the presence of the magnet. When the electronic controller is controlling the wireless transmitter circuit to output an alarm state wireless signal and the accelerometer senses movement of a window sash, the controller outputs an indication of movement of a window sash.

In one embodiment, an indication of movement is provided by the electronic controller when the controller is controlling the wireless transmitter circuit to output an alarm state wireless signal. The indication of movement includes changing the output of the wireless transmitter circuit to a normal state wireless signal for a predetermined time and then changing the output to an alarm state wireless signal.

In another embodiment, the accelerometer only senses positive or negative movement of the window sensing device in a given direction of travel of a window sash.

In one embodiment, the indication of movement provided by the electronic controller when the controller is controlling the wireless transmitter circuit to output an alarm state wireless signal includes transmitting a separate wireless accelerometer output signal in addition to the alarm state wireless signal or the normal state wireless signal.

In another embodiment, the accelerometer provides acceleration signals for the X, Y and Z axes to the electronic controller, and one of the axes corresponds to movement for opening or closing of a window sash.

In one embodiment, the electronic controller provides a window tampering wireless signal in response to one of the acceleration signals not corresponding to a given direction of movement of a window sash exceeding a threshold value. In one embodiment, the window tampering wireless signal represents acceleration signals sensed by the accelerometer that correspond to a breaking of a glass window.

In another embodiment, the accelerometer, the magnetic sensor, the wireless transmitter circuit, and the electronic controller are disposed in a housing and the housing is secured to a window. A magnet is secured to a window frame.

In one embodiment, the accelerometer, the magnetic sensor, the wireless transmitter circuit, and the electronic controller are disposed in the housing and the housing is secured to a sliding door. A magnet is secured to a door frame. In another embodiment, the sliding door has a window.

In another embodiment, a magnetic window sensing arrangement for a window arrangement includes a magnet assembly having a single magnet secured to a window frame and a window sensing device secured to a window sash. The window sensing devices include a housing, an accelerometer configured to sense movement of a window sash in a given direction of travel, a magnetic sensor configured to sense presence of a magnet, a wireless transmitter circuit, and an electronic controller. The electronic controller is configured to receive an input from the accelerometer and an input from the magnetic sensor. The electronic controller is also configured to control the wireless transmitter circuit to output a normal state wireless signal when the magnetic sensor senses the presence of the magnet and to output an alarm state wireless signal when the magnetic sensor does not sense the presence of the magnet. Further, when the electronic controller is controlling the wireless transmitter circuit to output an alarm state wireless signal and the accelerometer senses movement of a window sash, the electronic controller is configured to output an indication of movement of a window sash.

In one embodiment, a method for arming and operating window sensing devices comprises receiving an actuation or input from a user interface to arm an alarm system, detecting with the window sensing devices that at least one window sash is open, and providing an indication to the user interface indicating which one or more of a plurality of window sashes is open and blocking an arming of the alarm system. The method includes receiving an actuation or input from a user interface to bypass open window sashes and arm the alarm system, arming the window sensing devices of closed window sashes while blocking alarm state wireless signals from one or more open window sashes from triggering an alarm, and when an accelerometer of one of the window sensing devices senses movement of an open window sash, receiving an indication of the movement from the window sensing device.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 2:
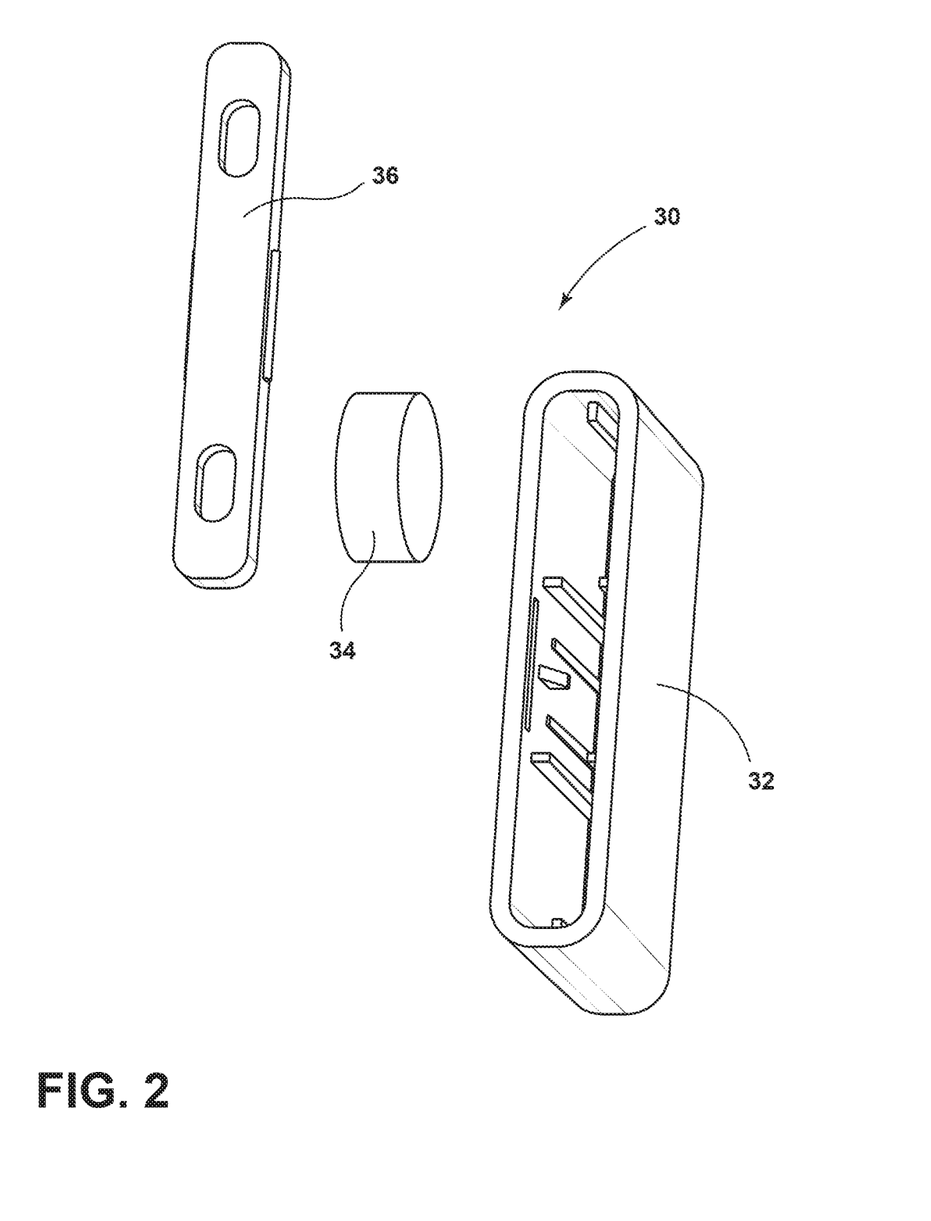
FIG. 2 is an exploded view of a magnet assembly.

FIG. 2 is an exploded view of a magnet assembly 30 that includes a magnet housing 32 and a magnet 34 disposed therein. The magnet assembly 30 includes a magnet housing mounting plate 36 for mounting the magnet assembly 30 to a window frame.

Figure 3:
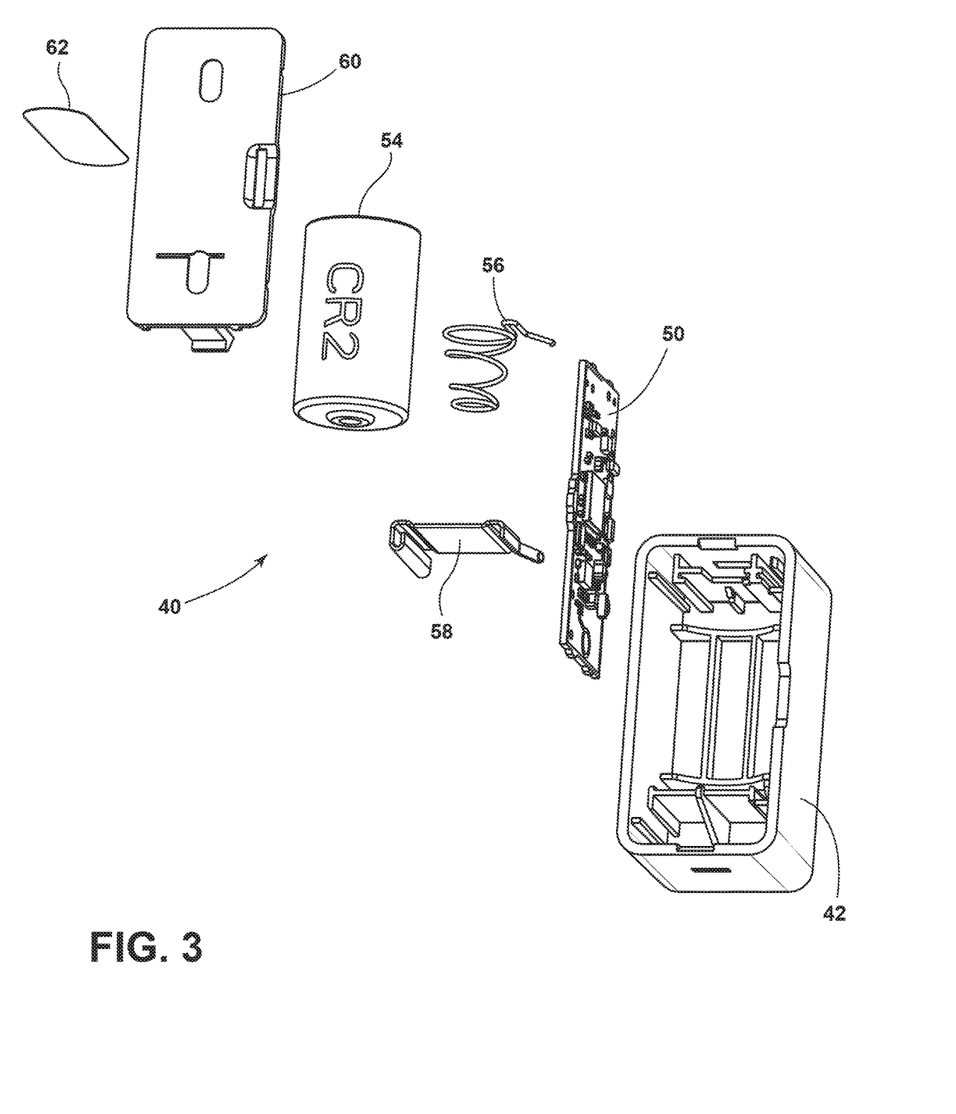
FIG. 3 is an exploded view of a window sensing device.

FIG. 3 is an exploded view of a window sensing device 40. The window sensing device 40 includes an enclosure housing 42. The enclosure housing 42 is configured to receive a printed circuit board 50. The enclosure housing 42 is also configured to receive a battery 54, a battery coil spring 56 and a battery contact leaf spring 58. The window sensing device 40 includes a mounting plate 60 for mounting to a window sash. A battery pull tab insulator 62 is removed so the battery 54 in the enclosure housing 42 provides power.

Figure 4:
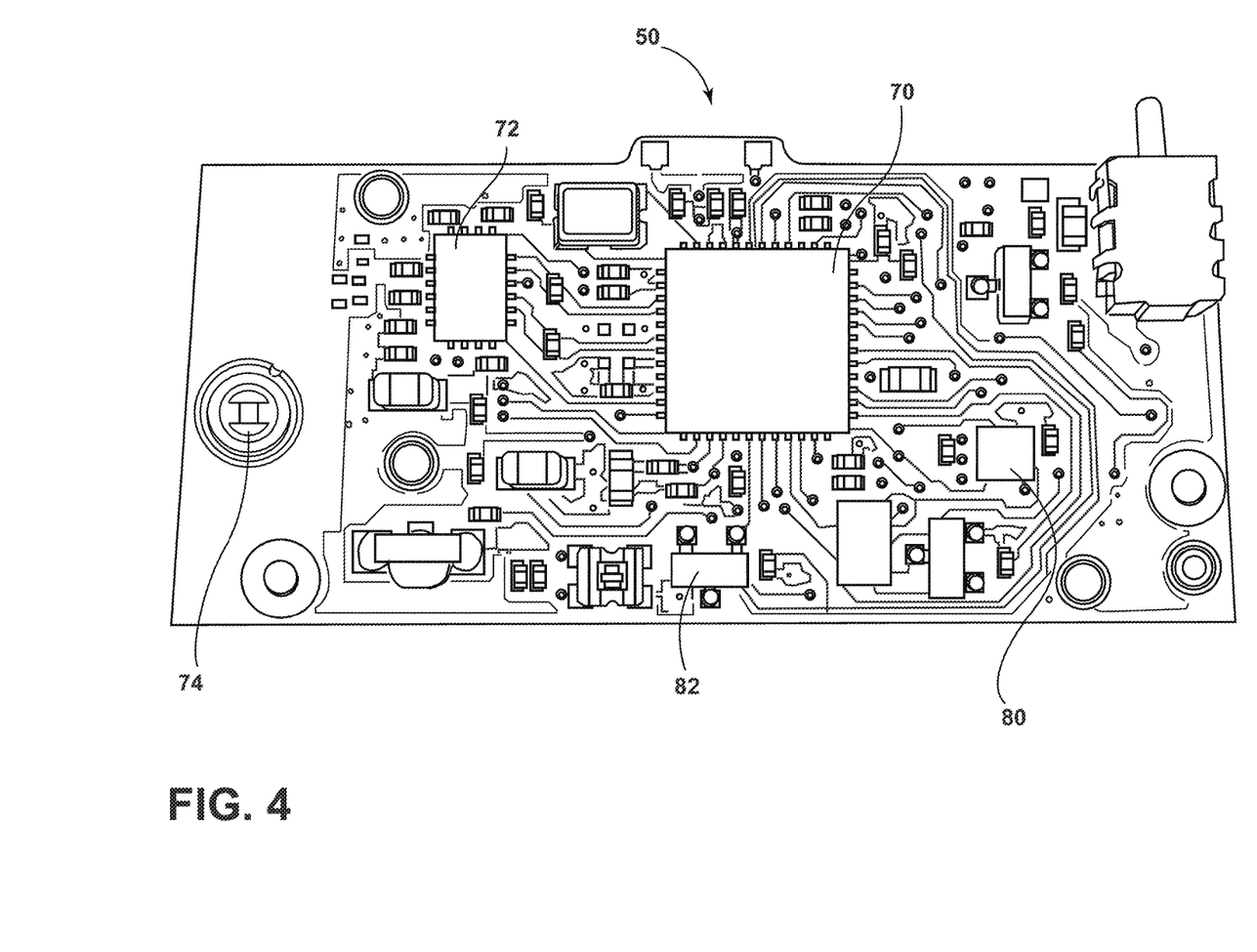
FIG. 4 is a perspective view of a printed circuit board of the window sensing device.

FIG. 4 shows the printed circuit board 50. The printed circuit board 50 includes an electronic controller 70 and a front end module 72 with an RF power amplifier. Further, the printed circuit board 50 includes an antenna 74. In one embodiment, the printed circuit board 50 includes a 3-axis accelerometer 80 and a magnetic sensor 82. Other integrated circuits, resistors, capacitors and the like are shown to provide power to various elements and to provide communication between various elements of the printed circuit board 50.

Figure 5:
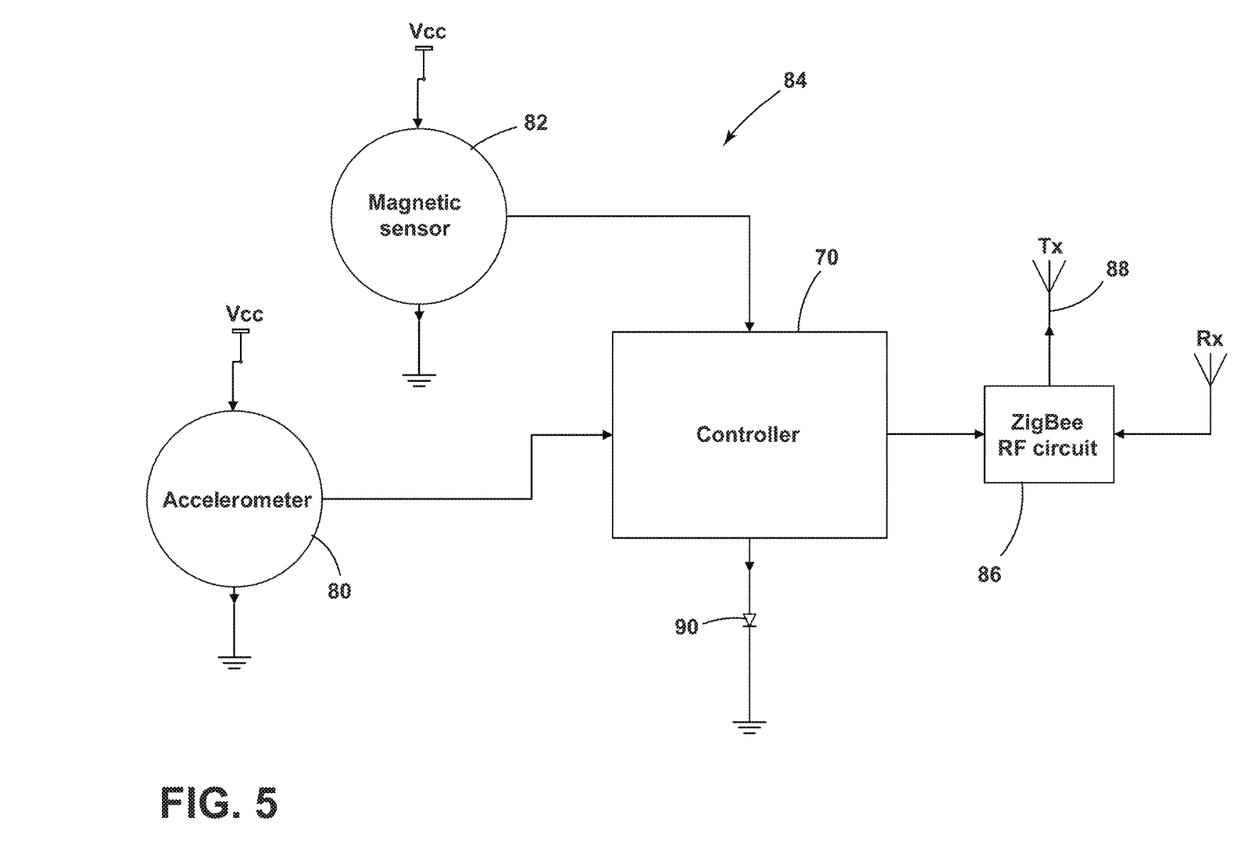
FIG. 5 is a block diagram of the window sensing device.

FIG. 5 shows a block diagram 84 of relevant components of the window sensing device 40. The block diagram 84 includes the electronic controller 70 that receives inputs from the accelerometer 80 and the magnetic sensor 82. The electronic controller 70 provides an output to a wireless transmitter circuit 86. In one embodiment, the wireless transmitter circuit 86 is a Zigbee RF circuit for broadcasting via an antenna 88 to a user interface and/or a control panel. FIG. 5 shows an indicator 90, such as a light emitting diode (LED) indicator, for receiving and visually displaying an output from the electronic controller 70.

The printed circuit board 50, and thus the accelerometer 80, the magnetic sensor 82, the wireless transmitter circuit 86, and the electronic controller 70 are disposed in the enclosure housing 42 of the window sensing device 40 and the window sensing device is secured to a window sash.

Installation

Figure 6:
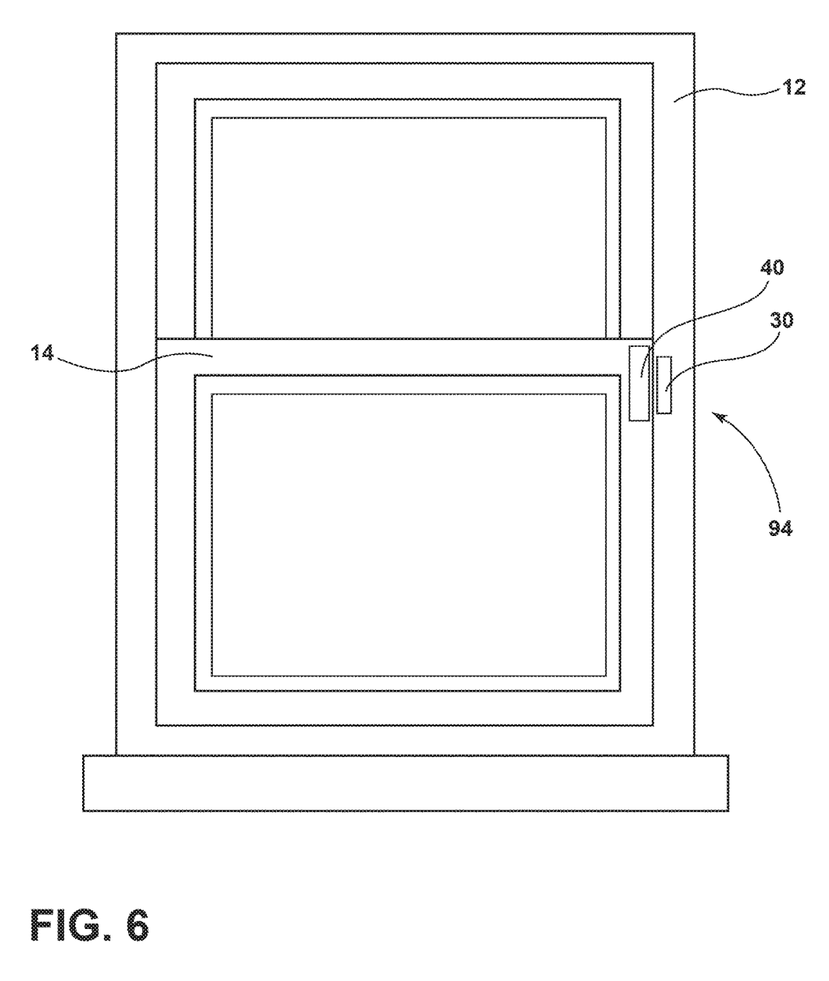
FIG. 6 is a front view of one embodiment of a window sensing arrangement including the window sensing device and the magnet assembly.

In the embodiment shown in FIG. 6, the magnet assembly 30 and the window sensing device 40 are mounted to a window arrangement to form a magnetic window sensing arrangement 94. The window sensing device 40 is secured onto a sliding/moving part of the window or near the top of a lower window sash 14 as shown in FIG. 6. The magnet assembly 30 is secured on the window frame 12 so that the magnet assembly 30 is adjacent to or in alignment with the window sensing device 40 when the window sash 14 is in the closed position as shown in FIG. 6. The mounting of the magnet assembly 30 and the window sensing device 40 is provided by fasteners, adhesives, clamps or other known mounting arrangements.

Figure 6A:
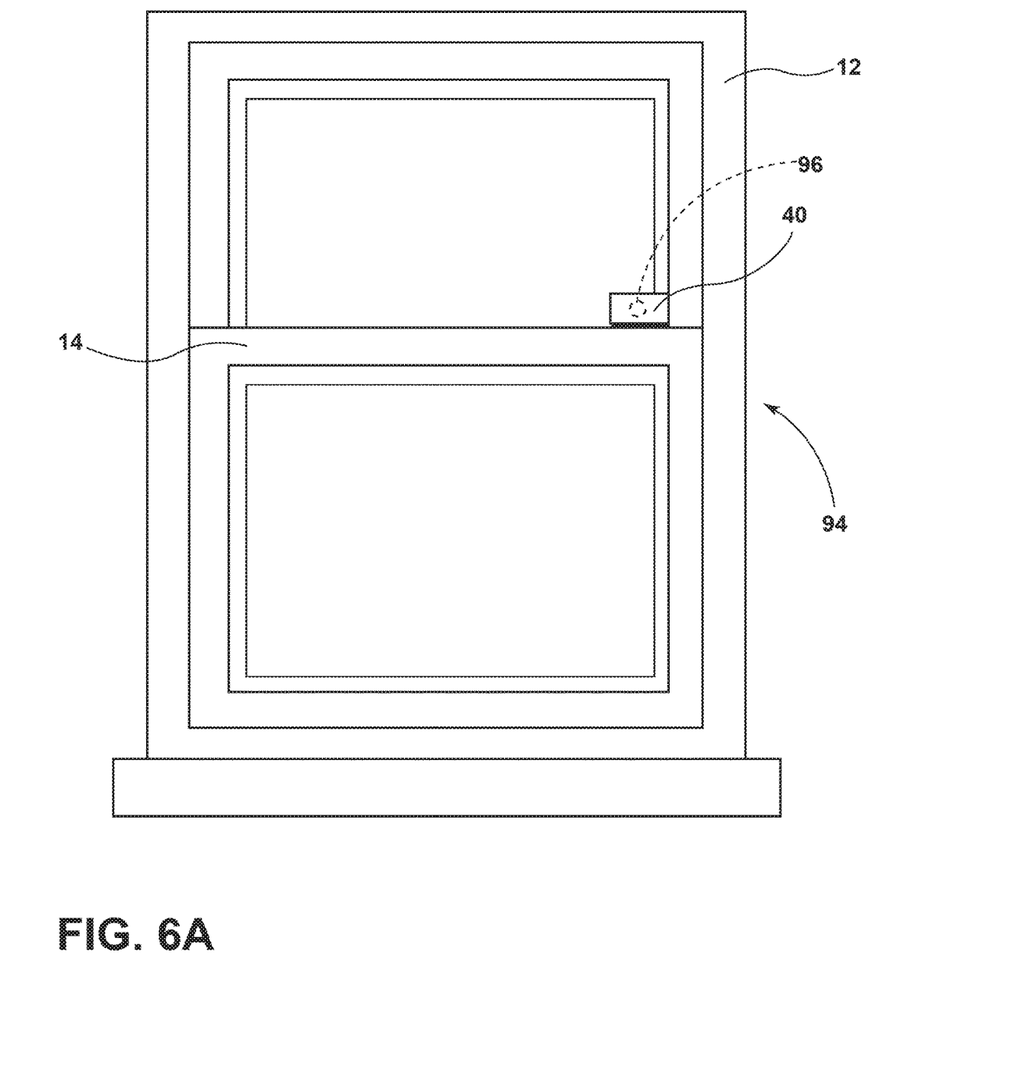
FIG. 6A is a front view of another embodiment of a window sensing arrangement.

In the embodiment with a double hung window shown in FIG. 6A, a magnet 96 is mounted on a lower part of a window pane of window glass of an upper window sash and the window sensing device 40 is mounted onto an upper edge or surface of the lower window sash 14 at respective adjacent locations that are essentially in alignment when the pair of window sashes are closed. The magnet 96 is of limited thickness or diameter so that the magnet 96 may avoid contact with the window sash 14 when the window sash 14 is moved upwardly, or when the upper sash and the magnet 96 are moved downwardly. The magnet 96 is mounted with double sided tape to the window glass or window pane of the upper sash. In this embodiment, movement of either window sash is detected.

In some embodiments, the window(s) or window sashes are movable vertically. In other embodiments, the window(s) or window sashes move in a horizontal direction. Only one, single magnet 34, 96 and a single magnet assembly 30 is desired for each window frame. Thus, the magnetic window sensing arrangement 94 is free from having more than one magnet 34 or magnet assembly 30.

Operation of the Window Sensing Device

Figure 7:
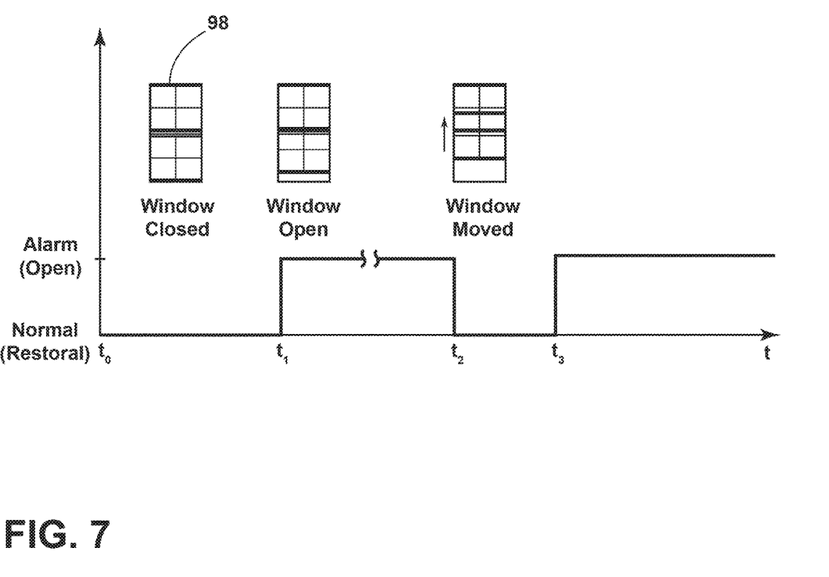
FIG. 7 is a graph of output of the window sensing device over time for different window positions.

In one embodiment, operation of the window sensing device 40 is as follows. The magnetic sensor 82 of the window sensing device 40 senses or detects the presence of a nearby magnet 34 when an associated window sash is in a closed position. The electronic controller 70 shown in FIG. 5 receives the detection signal from the magnetic sensor 82 and provides a normal signal to the wireless transmitter circuit 86. The wireless transmitter circuit 86 transmits a normal state wireless signal to a user interface or control panel. FIG. 7 shows a timeline wherein a window sash of a window 98 is sensed in a closed position from time $t_0$ to $t_1$. When this normal state wireless signal is output by the window sensing device 40, inputs from the accelerometer 80 to the electronic controller 70 related to movements of the window sash of the window 98 in the vertical (Y) direction are ignored, as the window is closed.

At time $t_1$ shown in FIG. 7, the window sash is opened. The magnetic sensor 82 of the window sensing device 40 senses the absence of the magnet 34 and provides a different signal output value to the electronic controller 70 than when the magnet is present. The electronic controller 70 determines from the different output value that the window sash is open and provides an alarm signal to the wireless transmitter circuit 86 that is wirelessly transmitted. Thus, the window sensing device 40 outputs an alarm state wireless signal for the condition of the window sash. When an alarm state wireless signal (window is open) is output by the window sensing device 40, inputs from the accelerometer 80 to the electronic controller 70 are not ignored. Thus, at time $t_2$ shown in FIG. 7, when the accelerometer 80 senses or detects window movement in the Y direction, the electronic controller 70 operates to provide a normal state wireless signal for a predetermined time illustrated from $t_2$ to $t_3$ and then returns to an alarm state wireless signal at $t_3$ as shown in FIG. 7. The output remains as the alarm state wireless signal until the window sash is closed or movement of the window sash is again detected. In some embodiments, the predetermined or preselected time illustrated from $t_2$ to $t_3$ is from about three seconds to about seven seconds. In one embodiment, the predetermined time is about five seconds.

The above arrangement discussed with respect to FIG. 7 is accurate with respect to the embodiment of FIG. 6 and the embodiment of FIG. 6A. The difference between the embodiments is that in an open window state, movement of the upper sash in FIG. 6A will not necessarily be sensed by the accelerometer 80 of the window sensing device 40 secured to the lower sash 14.

User Interface

Figure 8:
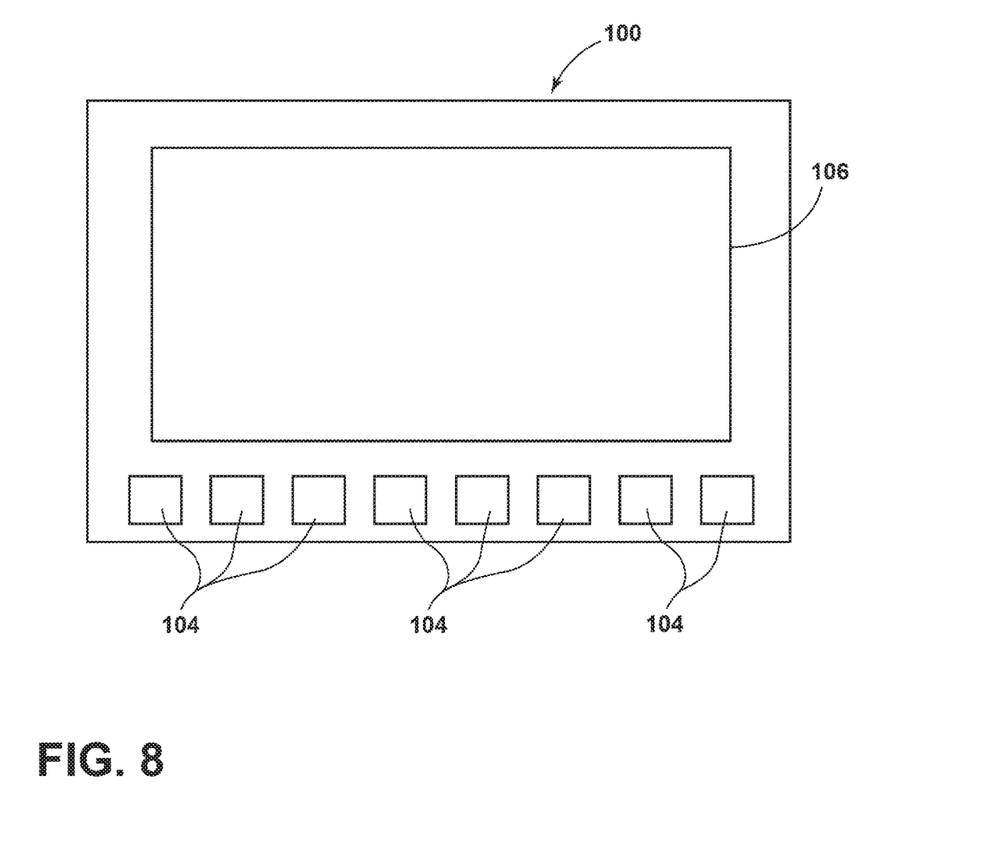
FIG. 8 is a front view of a user interface.

FIG. 8 shows a user interface 100, such as a control panel. The user interface 100 includes a plurality of inputs 104 and a display 106. In some embodiments, the inputs 104 are icons on a touchscreen that includes the display 106. In other embodiments, the inputs 104 are physical buttons provided separately from a display 106. In one embodiment, the user interface 100 communicates with a plurality of window sensing devices 40 provided on premises to be secured.

Figure 9:
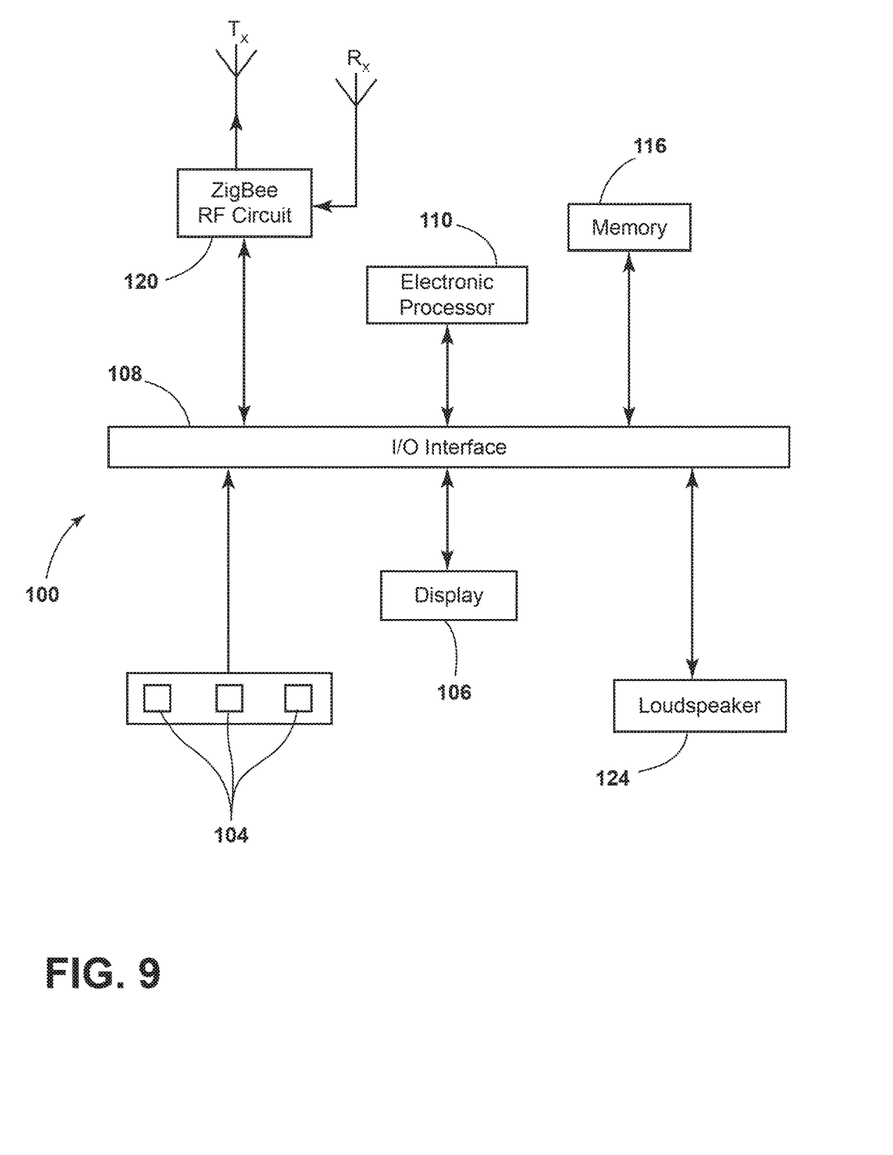
FIG. 9 is a block diagram of the user interface.

The block diagram of the user interface 100 shown in FIG. 9 includes an I/O interface 108 or communication bus connecting an electronic processor 110 with the inputs 104, the display 106, a memory 116, along with a Zigbee arrangement 120 and an alarm is output from a loudspeaker 124. Further, a particular window sensing device 40 causing an alarm is indicated on the display 106.

In FIG. 9, the user interface 100 utilizes the Zigbee arrangement 120 to communicate with a plurality of window sensing devices 40 provided on a premises to be secured. Other embodiments include Bluetooth, and other short range transceiver arrangements.

In another embodiment, the user interface 100 is provided as a user application on a cellular telephone and, besides the Zigbee arrangement 120, is configured to utilize an Internet and/or WiFi communication arrangement to directly or indirectly communicate via a local access point or access points with multiple window sensing devices 40. An alarm is output by the cellular telephone and a particular window sensing device providing the alarm is displayed.

Operation of the User Interface

In operation, the user interface 100 enables a user to determine the condition of all of the windows of a home or other premises that have window sensing devices 40. The user interface 100 receives an actuation from an input 104 to arm an alarm system. The window sensing devices 40 detect whether the respective window sashes 14 are open, and the user interface 100 provides an indication as to which one or more of a plurality of window sashes is open. The open window sashes initially block an arming of the alarm system.

In the event that at least one window sash is open in one room and the respective window sensing device 40 provides an alarm state wireless signal, the user may check and close the window. Alternatively, the user may provide an actuation with an input 104 to the user interface 100 to force arm the system to bypass the zone that includes the open window sash. This method of force arming includes arming the window sensing devices 40 of closed window sashes, while blocking any alarm state signals from the window sensing devices of one or more open window sashes from triggering an alarm when received by the user interface 100.

At this stage, if the accelerometer 80 of the window sensing device 40 senses or detects movement of a window sash that is previously open, as shown in FIG. 7, the window sensing device 40 outputs a restoring or normal state wireless signal for a predetermined time that resets and arms the zone with the window sensing device 40. After the predetermined period of time, the window sensing device 40 outputs the alarm state wireless signal and the user interface 100 recognizes opening of a window sash. Thus, the electronic controller 70 provides an indication of movement of an open window sash by controlling the wireless transmitter circuit 86 to output an alarm state wireless signal by changing the output of the wireless transmitter circuit 86 to a normal state wireless signal for a predetermined time and then changing the output to an alarm state wireless signal. Therefore, the user interface 100 receives a normal state wireless signal from the wireless transmitter circuit 86 for a preselected time and subsequently receives an alarm state wireless signal from the window sensing device 40. By rearming the zone in the manner shown in FIG. 7, the window sensing device 40 can be used with an existing user interface 100 without requiring any modification thereto.

Other Embodiments

In another embodiment, instead of the control of the output signal as shown in FIG. 6 and discussed above, the wireless transmitter circuit 86 is configured for transmitting a separate wireless accelerometer signal from the window sensing device 40 in in addition to an alarm state wireless signal or a normal state wireless signal. Then, the user interface 100 operates to make determinations as to alarm states based on the received signals.

While a 3-axis accelerometer 80 is disclosed in one embodiment, any type of accelerometer is contemplated. In the embodiment directed to FIG. 7, the accelerometer 80 only needs to be capable of sensing positive or negative movement of the window sensing device 40 in a given direction of travel of the window sash. That is the only information desired by the electronic controller 70 to rearm the user interface 100. In another embodiment, the accelerometer 80 provides acceleration signals for the X, Y and Z axes to the controller, wherein one of the axes corresponds to movement for opening or closing of a window sash.

In one embodiment with a separate accelerometer signal transmitted from the window sensing device 40, acceleration in other directions than the given direction of travel of a window sash are provided to the electronic controller 70. Depending on the strength of the acceleration signals and their directions, the electronic controller 70 determines that a window has been broken or tampering is occurring. Then the electronic controller 70 provides an alarm state wireless signal as set forth in the first embodiment or in another embodiment, a separate window tampering wireless signal to the user interface 100. Thus, a window tampering wireless signal is provided in response to one of the acceleration signals not corresponding to a given direction of movement of a window sash exceeding a threshold value. In one embodiment, the window tampering wireless signal represents acceleration signals sensed by the accelerometer 80 that correspond to a breaking of a glass window.

In some embodiments, the window or window sashes are movable vertically. In other embodiments, the window or window sashes move in a horizontal direction. The accelerometer 80 senses or detects the movement in the particular direction of interest for the particular window sash.

In one embodiment, the window sensing device 40 is mounted to a first sliding door and the magnet assembly 30 is mounted to a fixed window frame or to a second sliding door in a separate adjacent parallel sliding track. In another embodiment, the magnet assembly 30 is mounted to a sliding door frame and the window sensing device 40 is mounted nearby and in alignment when the sliding door is closed. In this arrangement, the sliding door acts as both a door and a window sash. The window sensing device 40 moves horizontally with the sliding door. In some embodiments, the sliding door includes a window.

In one embodiment, the wireless transmitter circuit 86 is a Zigbee RF circuit. In other embodiments, the wireless transmitter circuit 86 transmits infrared, ultrasonic or other known communication signals. In some embodiments, the window sensing device 40 includes a receiving antenna and a receiving circuit for two way communication with a user interface 100.

In one embodiment, the electronic controller 70 is a processor or microprocessor executing an algorithm stored in a non-transitory memory, for instance a read only memory (ROM) in one embodiment or a random access memory (RAM) to provide the outputs as set forth above. In another embodiment, the electronic controller 70 is an application specific integrated circuit (ASIC) executing the operations set forth above. Other control devices including a microcontroller are contemplated In one embodiment, the magnet 34 shown in FIG. 2 is replaced with two thin disc shaped magnets that are stacked to obtain the size and properties of the magnet 34. The thin disc shaped magnet 96 is sized for mounting on a window pane of an upper sash as discussed above.

Thus, the invention provides, among other things, an arrangement for determining movement of an open window sash and providing an alarm state wireless signal or other alarm in response thereto. Various features and advantages of the invention are set forth in the following claims.

What is claimed is:

1. A window sensing device for securing to a window sash comprising:
   a housing,
   an accelerometer configured to sense movement of a window sash in a given direction of travel,
   a magnetic sensor configured to sense presence of a magnet,
   a wireless transmitter circuit, and
   an electronic controller configured to receive an input from the accelerometer and an input from the magnetic sensor, the electronic controller configured to control the wireless transmitter circuit to output a normal state wireless signal when the magnetic sensor senses the presence of the magnet and to output an alarm state wireless signal when the magnetic sensor does not sense the presence of the magnet, and when the electronic controller is controlling the wireless transmitter circuit to output an alarm state wireless signal and the accelerometer senses movement of a window sash, the electronic controller is configured to output an indication of movement of a window sash,
   wherein the indication of movement provided by the electronic controller when the electronic controller is controlling the wireless transmitter circuit to output an alarm state wireless signal includes changing the output of the wireless transmitter circuit to a normal state wireless signal for a predetermined time and then changing the output to an alarm state wireless signal.

2. The window sensing device according to claim 1, wherein the accelerometer only senses positive or negative movement of the window sensing device in the given direction of travel of a window sash.

3. The window sensing device according to claim 1, wherein the accelerometer only senses positive or negative movement of the window sensing device in the given direction of travel of the window sash.

4. The window sensing device according to claim 1, wherein the accelerometer, the magnetic sensor, the wireless transmitter circuit, and the electronic controller are disposed in the housing and the housing is secured to a window sash.

5. The window sensing device according to claim 1, wherein the accelerometer, the magnetic sensor, the wireless transmitter circuit, and the electronic controller are disposed in the housing and the housing is secured to a sliding door having a window.

6. The window sensing device according to claim 1, wherein the accelerometer, the magnetic sensor, the wireless transmitter circuit, and the electronic controller are disposed in the housing and the housing is secured to a sliding door.

7. A window sensing device for securing to a window sash comprising:
   a housing,
   an accelerometer configured to provide acceleration signals for the X, Y and Z axes to the electronic controller, wherein one of the axes corresponds to movement for opening or closing of a window sash in a given direction of travel,
   a magnetic sensor configured to sense presence of a magnet,
   a wireless transmitter circuit, and
   an electronic controller configured to receive an input from the accelerometer and an input from the magnetic sensor, the electronic controller configured to control the wireless transmitter circuit to output a normal state wireless signal when the magnetic sensor senses the presence of the magnet and to output an alarm state wireless signal when the magnetic sensor does not sense the presence of the magnet, and when the electronic controller is controlling the wireless transmitter circuit to output an alarm state wireless signal and the accelerometer senses movement of a window sash, the electronic controller is configured to output an indication of movement of a window sash,
   wherein the indication of movement provided by the electronic controller when the electronic controller is controlling the wireless transmitter circuit to output an alarm state wireless signal includes transmitting a separate wireless accelerometer output signal in addition to the alarm state wireless signal or the normal state wireless signal, and wherein the electronic controller is configured to provide a window tampering wireless signal in response to one of the acceleration signals not corresponding to a given direction of movement of a window sash exceeding a threshold value.

8. The window sensing device according to claim 7, wherein the window tampering wireless signal represents the acceleration signals sensed by the accelerometer that correspond to a breaking of a glass window.

9. The window sensing device according to claim 7, wherein the accelerometer only senses positive or negative movement of the window sensing device in the given direction of travel of the window sash.

10. The window sensing device according to claim 7, wherein the accelerometer, the magnetic sensor, the wireless transmitter circuit, and the electronic controller are disposed in the housing and the housing is secured to a window sash.

11. The window sensing device according to claim 7, wherein the accelerometer, the magnetic sensor, the wireless transmitter circuit, and the electronic controller are disposed in the housing and the housing is secured to a sliding door having a window.

12. The window sensing device according to claim 7, wherein the accelerometer, the magnetic sensor, the wireless transmitter circuit, and the electronic controller are disposed in the housing and the housing is secured to a sliding door.

13. A magnetic window sensing arrangement for a window arrangement comprising:
   a magnet assembly having a single magnet secured to a window frame;
   a window sensing device secured to a window sash, including:
      a housing,
      an accelerometer configured to sense movement of a window sash in a given direction of travel,
      a magnetic sensor configured to sense presence of the magnet,
      a wireless transmitter circuit, and
      an electronic controller configured to receive an input from the accelerometer and an input from the magnetic sensor, the electronic controller configured to control the wireless transmitter circuit to output a normal state wireless signal when the magnetic sensor senses the presence of the magnet and to output an alarm state wireless signal when the magnetic sensor does not sense the presence of the magnet, and when the electronic controller is controlling the wireless transmitter circuit to output an alarm state wireless signal and the accelerometer senses movement of a window sash, the electronic controller is configured to output an indication of movement of a window sash,
      wherein the indication of movement provided by the electronic controller when the electronic controller is controlling the wireless transmitter circuit to output an alarm state wireless signal includes changing the output of the wireless transmitter circuit to a normal state wireless signal for a predetermined time and then changing the output to an alarm state wireless signal.

14. The window sensing device according to claim 13, wherein the accelerometer only senses positive or negative movement of the window sensing device in the given direction of travel of a window sash.

15. The window sensing device according to claim 13, wherein the indication of movement provided by the electronic controller when the electronic controller is controlling the wireless transmitter circuit to output an alarm state wireless signal includes transmitting a separate wireless accelerometer output signal in addition to the alarm state wireless signal or the normal state wireless signal.

* * * * *